June 17, 1930.  W. T. HENSLEY ET AL  1,765,270
APPARATUS FOR MAKING LAMINATED PULLEY UNITS
Filed May 31, 1927  6 Sheets-Sheet 5
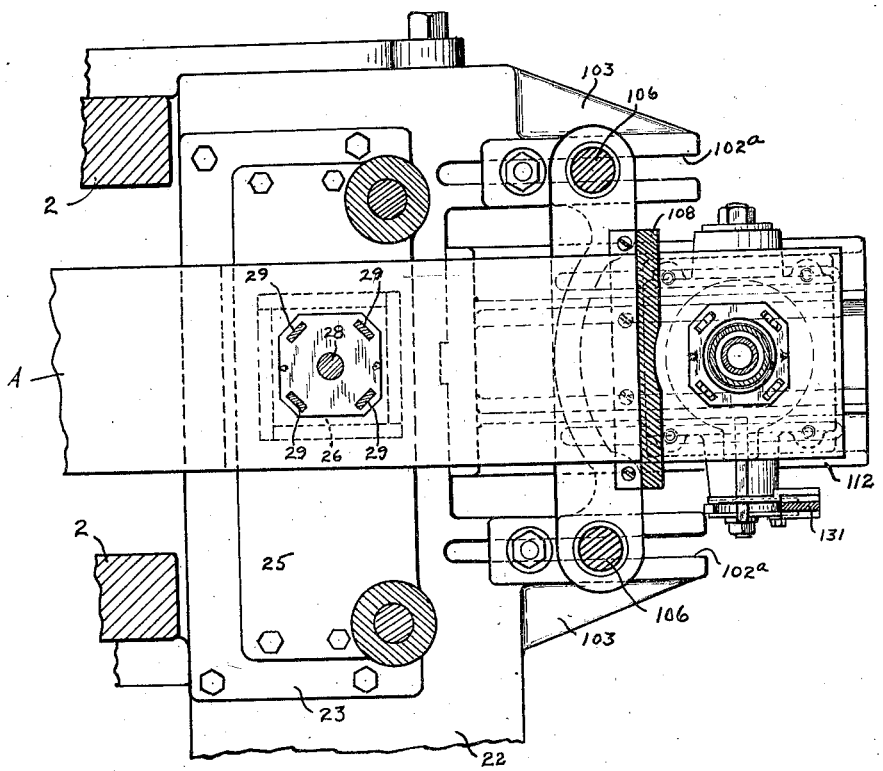
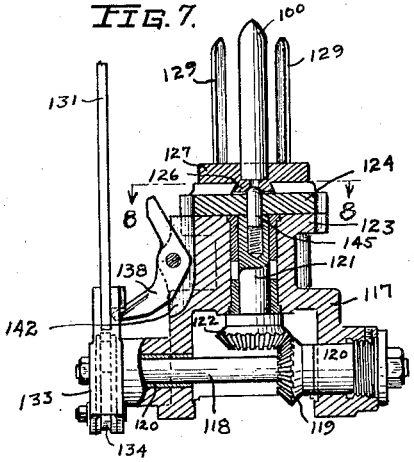
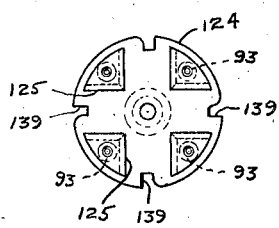
Inventors.
W. T. Hensley
R. H. Lewis
By Evans & McCoy Attorneys

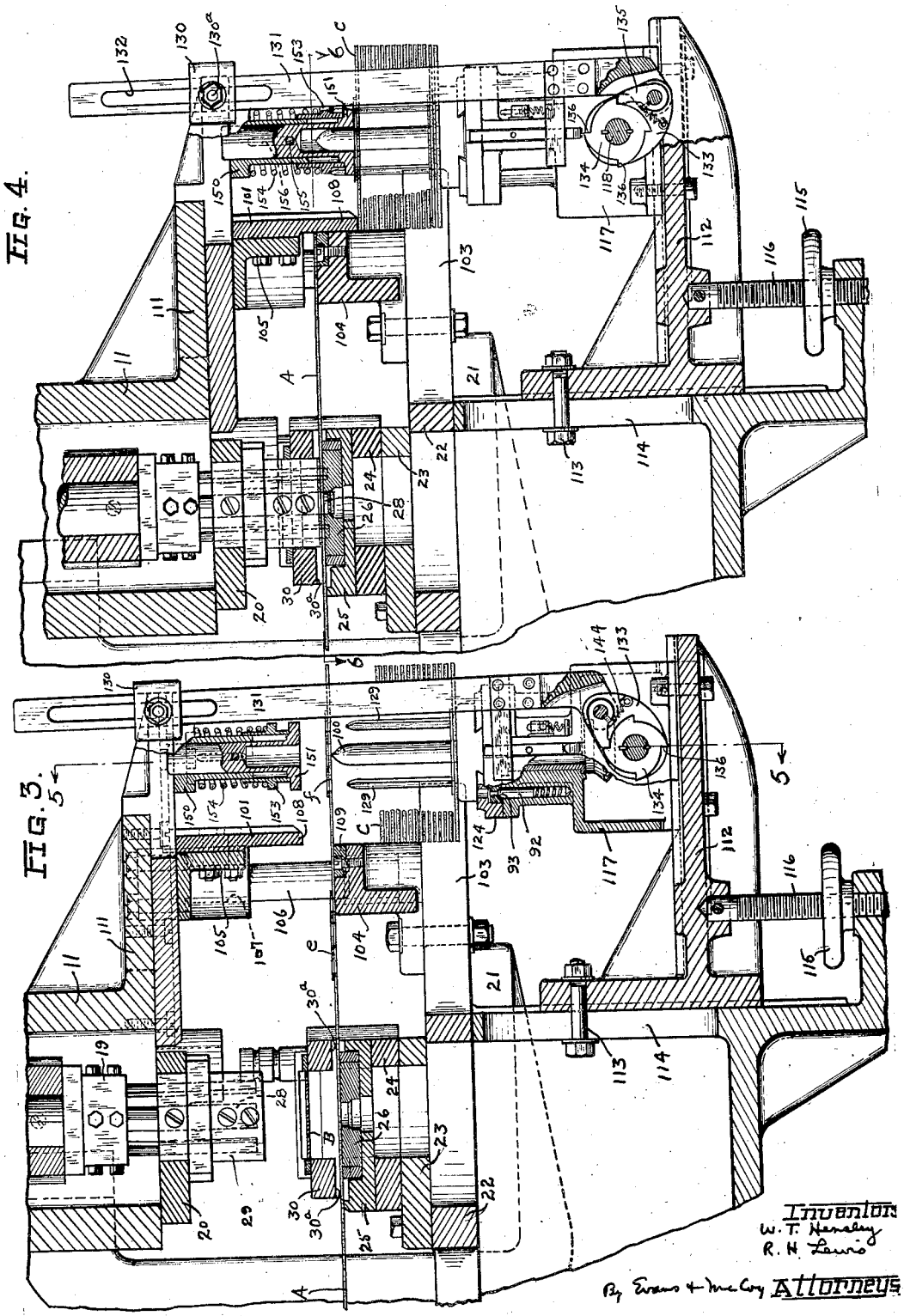

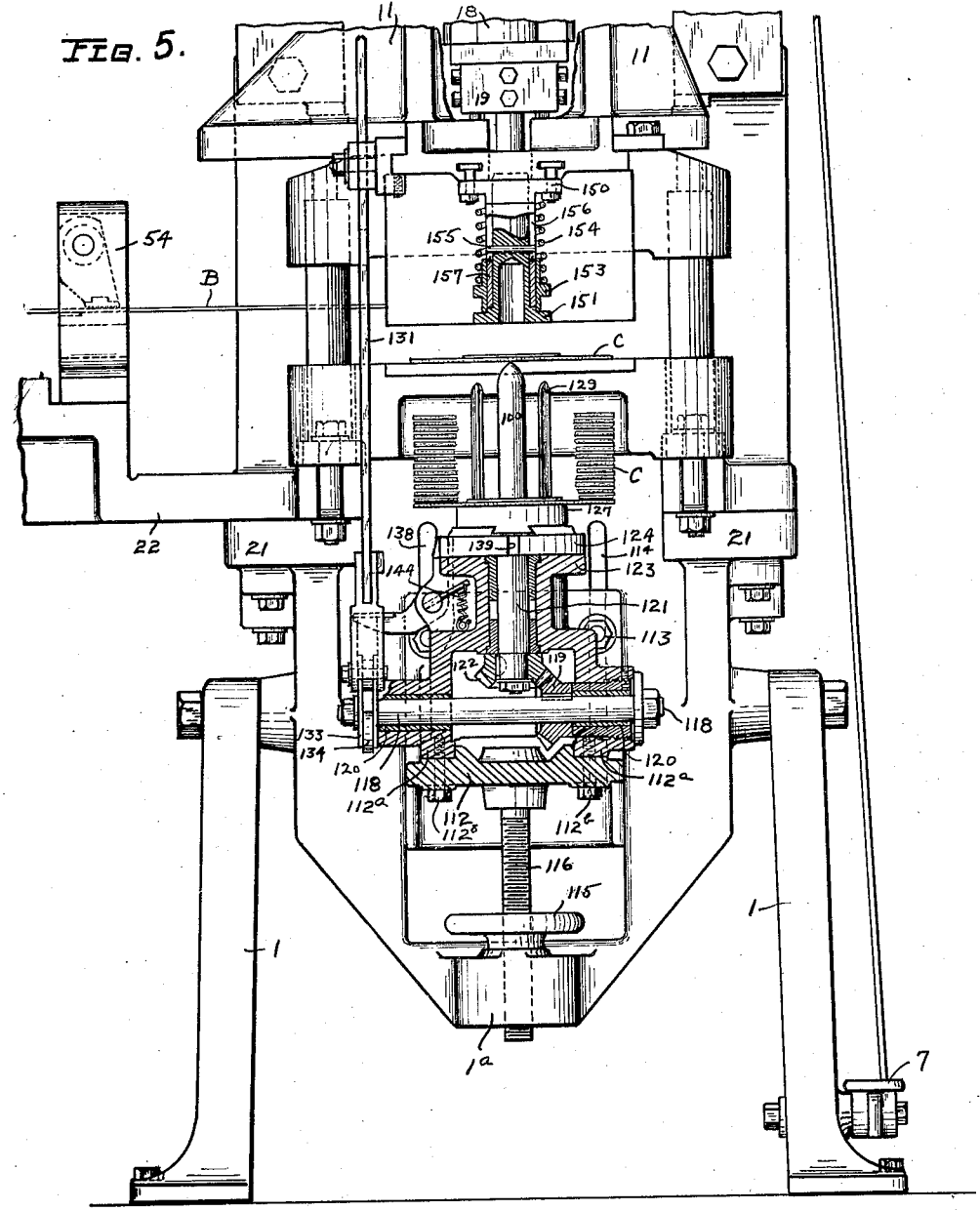

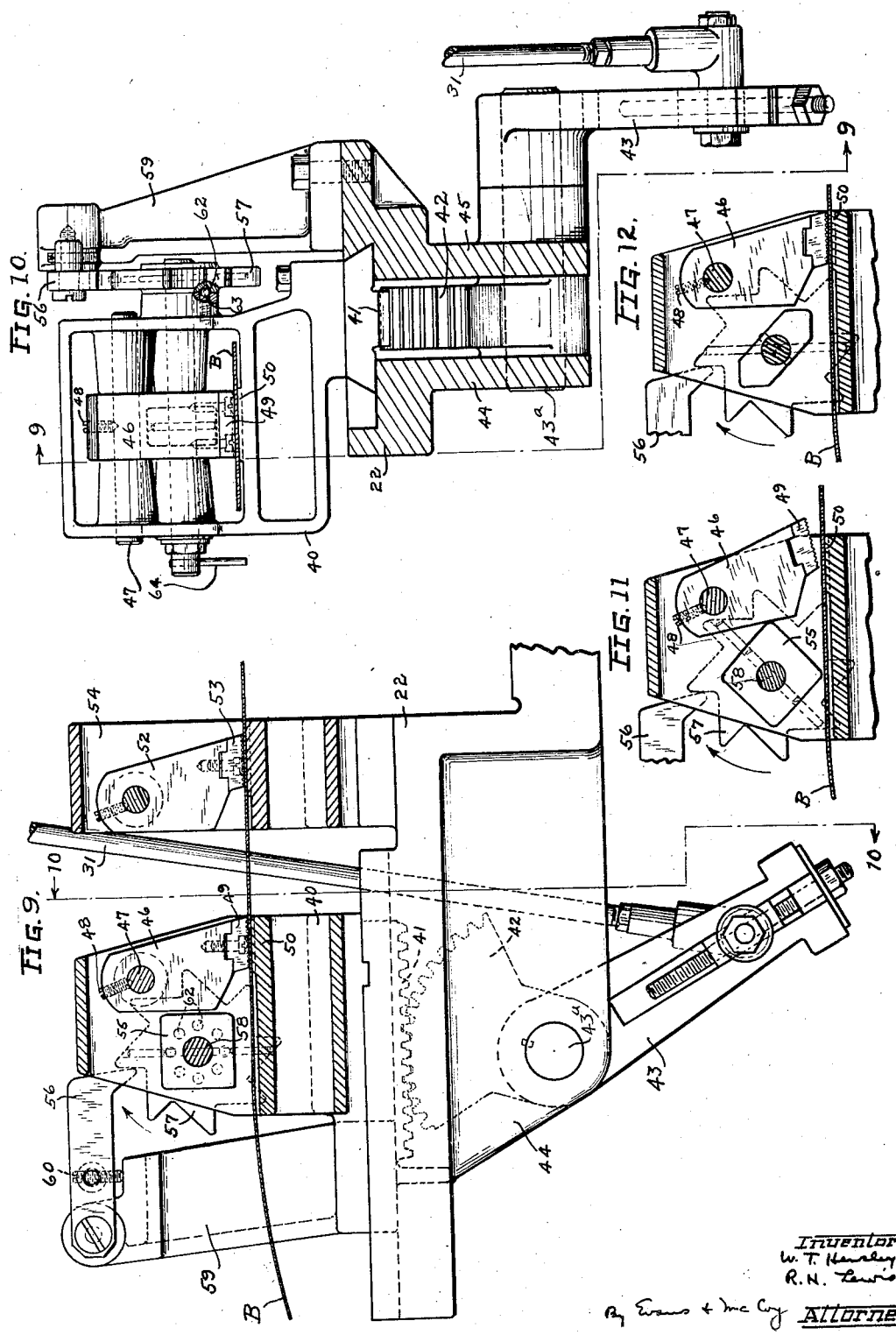

Patented June 17, 1930

1,765,270

UNITED STATES PATENT OFFICE

WILLIAM T. HENSLEY, OF INDIANAPOLIS, INDIANA, AND ROBERT H. LEWIS, OF CLEVELAND, OHIO; SAID LEWIS ASSIGNOR TO SAID HENSLEY

APPARATUS FOR MAKING LAMINATED PULLEY UNITS

Application filed May 31, 1927. Serial No. 195,364.

This invention relates to apparatus for assembling sheet material, and it particularly relates to improvements in the mechanism for assembling sheet material disclosed in United States Letters Patent No. 1,574,481 that issued to William T. Hensley on February 23, 1926.

In the embodiment of the invention herein disclosed, a mechanism is provided which is particularly adapted to fabricate a paper strip and a metal strip or two paper strips and assemble the same for the formation of laminated pulley units.

The strip frequently termed herein "the paper strip" may consist of any fibrous material having a definite grain, such as strawboard and the like. However, there are other fibrous materials that may be employed. During the formation of the laminated pulley units it is often desirable to cross the grain in the various layers to insure greater strength in the body of the fibrous material and to increase resistance against wear on the frictional surface of the finished pulley.

Similarly in the embodiment herein shown, the strip from which the relatively hard centers for pulley units are fabricated is termed the "metal strip" though it is obvious that it may be a relatively hard fibrous strip or any other relatively dense material to increase the density of the center of the completed pulley and to form a relatively hard core.

In the assembly of sheet material where two different types of material are assembled into units, it is sometimes desirable to group the material in different relations as regards the succession of superposed sheets. In accordance with the present invention apparatus is proposed for temporarily arresting the feed of material from one source relative to the supply of material from the other source in accordance with a prearranged succession.

It is also desirable in the assembly of blanks of grained sheet material to superpose the successive blanks of material with the grain thereof arranged in a predetermined angular relation in order to provide the most desirable qualities, such as wearing surface, uniform strength, etc., in the resulting assembled units.

One of the objects of this invention is to provide means for feeding a series of strips of sheet material into zones where the material is operated upon by the machine to prepare it for assembly into units, and to so control the feeding of one of the strips that material from that strip will be fed into the assembly zone of the machine only at proper predetermined intervals, differing from the feeding of the material from the other strip into the assembly zone.

Another object of the invention is to provide mechanism for feeding strips of material step by step longitudinally through the machine, and periodically interrupting the feed of one of said strips relative to the feed of the other strips so that blanks from one of the strips are superposed upon successive blanks from the other strip or upon every second or third successive blank from the first strip, or in any other predetermined relation thereto.

Another object of the invention is to provide an improved apparatus for stacking the blanks of grained material in a machine of the character proposed whereby the grain of certain of the blanks is arranged in angular relation with respect to the grain of certain other of the blanks.

An additional object of the invention is to provide mechanism controlled in a simplified manner for rotating the arbor or receiving member for receiving the blanks between certain successive depositions of blanks cut from the strips to change the angular relation of the grain of the different blanks disposed upon the receiving member.

A further object of the invention is to provide a rotating mechanism for the arbor or receiving member that positively locks the member in each rotated position after each operation in order that the deposition of the blanks deposited thereon will accurately register on the arbor and in the desired relation with the succeeding blanks.

Another object of the invention is to provide a controlled mechanism for partly rotating and positively locking the arbor or receiving member upon each reciprocation of the press in order that successive blanks may be deposited in registered relation to each other on the receiving arbor, and in order that successive laminæ will have the grain thereof extending in different angular directions.

An additional object of the invention is to provide a machine in which the method of severing and simultaneously depositing the blanks of sheet material on the receiving arbor disclosed in the aforesaid issued patent is utilized, and in which the blanks are arranged, by the operation of the machine, with the grain of successive blanks in predetermined angular relation.

Another object of the invention is to provide a machine in which the feeding mechanism is adjustable and the shear mechanism is adjustable so that different widths of strips may be used and different length from the same cut off to form proper sized blanks for the formation of a desired diameter of pulley.

Another object of the invention is to provide an improved means for depositing and pressing down successive blanks on the arbor or receiving member, so that failure of the assembly head to properly register with the receiving arbor will not damage the machine.

Other objects of the invention and advantages to be gained by practicing the same, will be apparent from the embodiment of the invention shown in the accompany drawings wherein:

Fig. 3 is a vertical sectional view taken through the mechanism for fabricating the strips of sheet material, showing the die and other parts in section and the arbor or receiving member in place with the assembled units broken away to show the arbor and other parts of the receiving member. The reciprocating parts are shown in the upper or raised position.

Fig. 4 is a section similar to that shown in Fig. 3 with the parts illustrated in a different operating, or downward, position.

Fig. 5 is a vertical sectional view through the axis of the receiving mechanism and taken substantially on line 5—5 of Fig. 3.

Fig. 6 is a horizontal section on line 6—6 of Fig. 4.

Fig. 7 is a vertical section through the receiving mechanism.

Fig. 8 is a top view of the interlocking plate, the view being taken on line 8—8 of Fig. 7.

Fig. 9 is a side elevational view partly in section taken on line 9—9 of Fig. 10 showing the feed mechanism for the metal strip.

Fig. 10 is a vertical section on line 10—10 of Fig. 9.

Fig. 11 shows the feed controlling ratchet wheel device of Fig. 9 in a different operating position.

Fig. 12 is a modified form of control ratchet wheel device.

Figure 1:
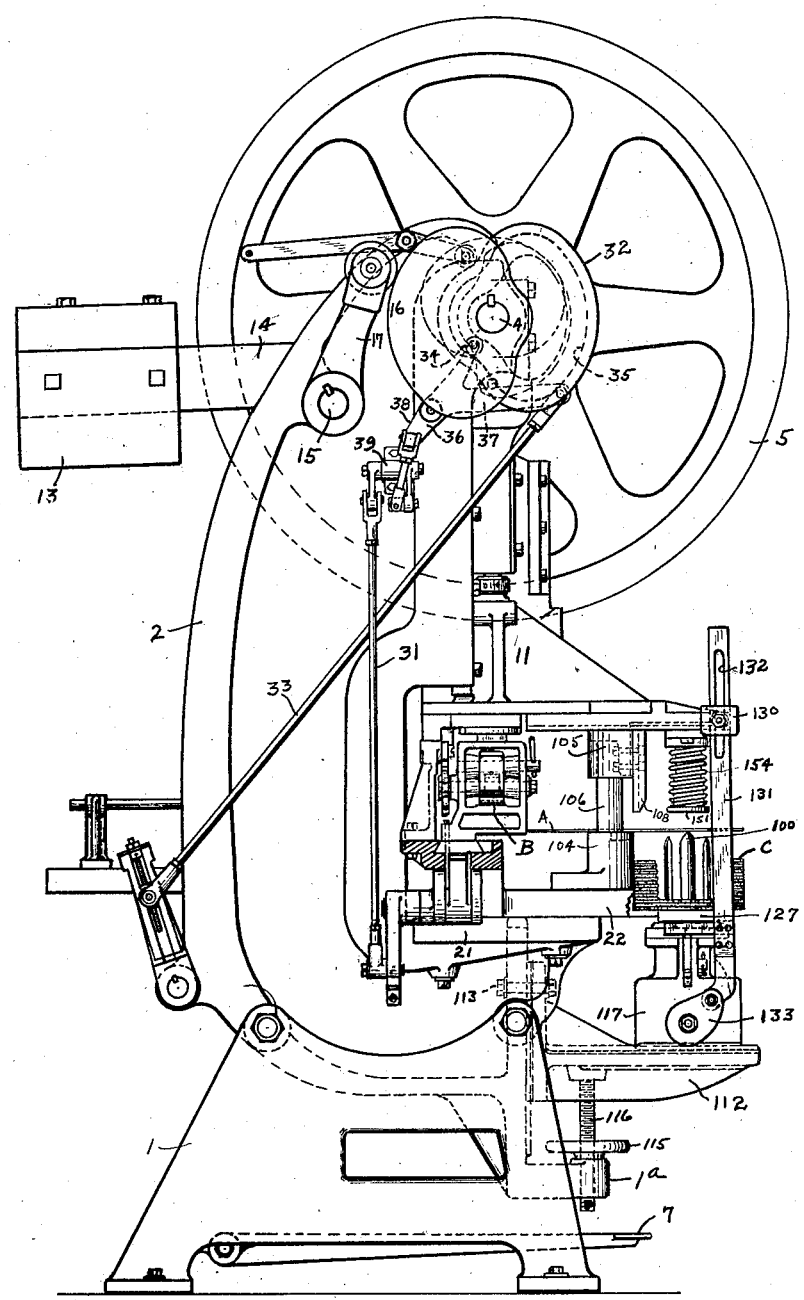
Figure 1 is a side elevational view of a machine embodying the invention with the arbor or receiving member and a portion of the fabricating mechanism shown, some parts in section and with the assembly of units broken away for the sake of clearness of illustration.
Figure 2:
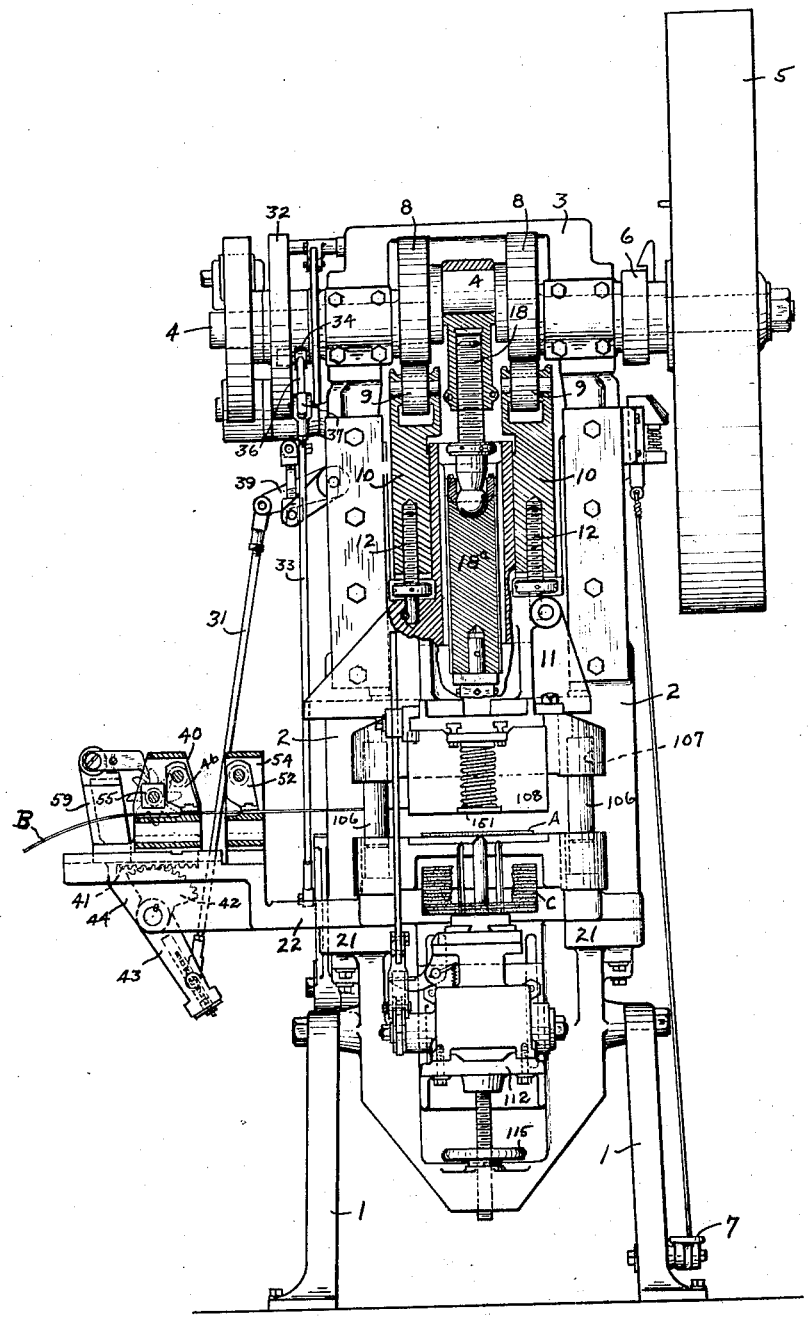
Fig. 2 is a front elevational view of the machine shown in Fig. 1, portions of the machine being shown in section.

Reference may be had to the above designated patent for a full description of the machine parts not particularly involved in the present invention.

In the machine disclosed in the accompanying drawings the base 1 of the machine carries the frame comprising the side uprights 2 and the top cross piece 3. The crank shaft 4 is journaled in the side uprights 2. At one end of the crank shaft 4 the fly wheel 5 is carried and it may be driven from any suitable source of power, such as an electric motor (not shown). The fly wheel 5 is mounted to rotate freely on the crank shaft 4 and to drive the crank shaft when the clutch 6 is thrown into engagement by depression of the foot lever 7. The crank shaft is provided with cams 8 which engage rollers 9 of reciprocating members 10 to which the ram 11 is adjustably connected by bolts 12. The cams 8 cause movement of the ram downward by engagement with the rollers 9. A counterbalance weight 13 is carried by the arm 14 which is clamped at its intermediate portion to the shaft 15, the latter being journaled in the side uprights of the frame. In order to positively move the counterbalance weight substantially in synchronism with the movement of the ram, cam 16 is provided which engages the roller on the arm 17, the latter being secured to shaft 15 to turn therewith, thus insuring the rollers 9 approximately following the cams 8 upon the upward stroke of the ram, the counterbalance weight 13 insuring a close contact between the rollers 9 and the cams 8 in all movements of the ram.

Similarly, the crank shaft 4 operates the connecting rod 18 which is adjustably connected to the ram 18ª which holds the punch 19 and causes the latter to reciprocate within the ram 11, as is customary in double acting presses of this type, there being suitable guides provided for the movement of both the ram and punch.

Secured to the ram 11 is a punch holder 20 to carry the tools for working on one of the strips entering into the production of the pulley units. In the design of machine shown in the drawings, this strip is the metal strip B and its fabrication will be hereinafter described.

Carried on the bed 21 of the machine is a bolster 22 on which is mounted subplate 23 and the die block 24 in which the die holder 25 is mounted to carry the die 26. The die 26 comprises a central member having a central perforation to receive the perforating member 28 and it also has openings for receiving the perforating members 29 of the punch 19. Also mounted on the die block 24 is a bridge member 30 which is cut away at 30ª intermediate its ends so that it is spaced from the die 26 to provide a passage between the bridge 30 and the die 19 through which the paper strip A is fed. This strip A, as stated in the aforementioned Patent #1,574,481, is preferably of strawboard or any other desirable material having a definite grain. For the sake of clearness and convenience, in the specification the strip A will hereinafter be referred to as a paper strip.

The metal strip B passes over the upper face of the bridge 30 where it is acted upon by the tools carried by the punch holder 30 of the ram 11.

The paper strip A and the metal strip B are fed through the machine from different directions in order that each strip may be operated upon by the machine at different stations and the two strips then brought together to form the elements to be assembled on a receiving arbor of the machine. It is desirable in some instances to superpose one metal blank upon each fibrous blank, and in other instances it is desirable to superpose a metal blank only on every second or every third fibrous blank, or in some other desired sequence.

In order to accomplish this result, an improved form of feed mechanism for intermittently advancing the metal strip B is proposed so that the metal strip is advanced only with every other cycle of operation of the punch or in other desired sequence relative to the advance of the paper strip, the feed mechanism for the paper strip being of any suitable character adapted to advance the strip in step by step movement through the operating stations of the machine.

The feeding mechanism for the paper strip A has been carefully described in the aforesaid prior patent. So far as the present invention is concerned, it is unnecessary to go into this feeding mechanism for the paper strip A in greater detail. Any suitable feed for this strip of material may be used in the machine herein disclosed. The feeding mechanism for the metal strip, however, has certain novel features which now will be described in detail, it being understood, however, that the reciprocating connecting rod 31 for actuating the feeding mechanism for the metal strip B is preferably, although not necessarily, controlled by the same cam arrangement that actuates the feed of the paper strip A. The object of this is to synchronize the movement of the two strips through the machine.

The feeding mechanism for both the metal strip and the fibrous strip is actuated by a suitable cam 32 that reciprocates connecting rods 31 and 33 through the action of a cam roller 34 that travels in a cam race 35 formed in a lateral face of the cam 32. The roller 34 is carried on one arm of member 36 that is pivotally mounted on the frame of the machine. The member 36 also has an arm 37 that actuates the connecting rod 33 that controls the feeding of the paper strip A, and an arm 38 that actuates the connecting rod 31 through the operation of transmission assembly 39 for controlling the intermittent feed of the metal strip B.

The feed mechanism for the metal strip B is shown in detail in Figs 9, 10, 11 and 12 of the drawings which are now particularly referred to. In general, the feeding mechanism embodies a reciprocating carriage 40 that has a suitable rack 41 formed thereon that engages with a pinion 42 that is actuated by the reciprocating movement of the connecting rod 31 through a crank arm 43. The reciprocating carriage moves in a suitable guide of conventional form carried by an extension of the bolster 22 that is shown broken away in Fig. 5. The bolster 22 has a pair of depending flanges 44 and 45 in which the pinion 42 is journaled, the pinion being carried on one end of a stub shaft 43ª that has the adjustable crank arm 43 on its other end. It will readily be seen that the reciprocating movement of the connecting rod 31 therefore causes corresponding reciprocating movement of the carriage 40.

The reciprocating carriage 40 has a pivotally mounted dog 46 that is secured on a transverse shaft 47 by a suitable set screw 48. The dog 46 has a toothed pressure foot 49 carried thereby that serves to clamp the sheet B between a suitable platen 50 of the carriage and the dog to cause the sheet of material to be advanced with each advancing movement of the reciprocating carriage when the dog 46 is in its clamping position. The dog 46 is so arranged that, upon return movement of the reciprocating carriage, the sheet B is released by the pivotal movement of the dog, and the carriage returns to its initial position with the dog sliding freely over the face of the strip of material.

A corresponding dog 52 that also has a toothed pressure foot 53 and that is otherwise similar to the dog 46, is pivotally mounted between a pair of spaced uprights 54 that are carried by the extension of the bolster 22. The dog 52 prevents return movement of the strip of material B but permits free advance movement of the strip of material.

The combination of the dog 52 that is carried by the frame of the machine and that prevents return movement of the strip B of material, with the corresponding dog 46 that is mounted on the reciprocating carriage would normally serve to advance the material with each forward movement of the carriage as is well known in the art.

In view of the fact that it is desired to superpose a metal blank on alternate fiber or paper blanks, the feed mechanism for the metal strip is so controlled by a cam 55 that the metal strip is fed forward with every other movement of the reciprocating carriage rather than with each movement of the reciprocating carriage, the dog 46 being rendered inoperative during every other operation of the carriage in order to accomplish this purpose.

The mechanism for controlling the dog 46 comprises the cam 55 that is intermittently operated by the action of a suitable pawl 56 and a ratchet wheel 57 that is mounted on one end of the shaft 58 that carries the cam 55. The pawl 56 is pivotally mounted on a stationary support 59 and has a suitable adjusting screw 60 for controlling its position with respect to the ratchet wheel 57. The ratchet wheel 57 has a series of depressions 62 that register with a spring pressed plunger 63 that is carried by the carriage for holding the ratchet wheel in each advanced position. The number of lobes on the operating cam 55 bears a definite relation to the number of teeth on the ratchet wheel in order that the lobes will be moved into operative position to release and render the dog 46 inoperative during a predetermined number of movements of the reciprocating carriage, or in accordance with some predetermined desired sequence of delivery of metal blanks to the units of fibrous blanks being delivered by the machine. In the particular embodiment of the ratchet wheel and cam construction illustrated in detail in Fig. 9 and Fig. 11, the number of lobes on the operating cam is one-half the number of teeth on the ratchet wheel so that the presser foot is rendered inoperative for alternate movements of the reciprocating carriage 40.

This structure may be more clearly described by briefly setting forth the operation of this portion of the machine independent of the other operating parts. With the forward movement of the reciprocating carriage from the position shown in Fig. 9, the strip of sheet material B is engaged by the dog 46 and advanced by the reciprocation of the carriage 40 and locked in its advanced position by the dog 52 that is mounted on the frame of the machine. Upon return movement of the reciprocating carriage, the pivoted arm or pawl 56 engages the succeeding tooth of the ratchet wheel and moves the cam 55 through 45 degrees of rotation. This brings an operating lobe of the cam into engagement with the coacting face of the dog 46 that is mounted on the reciprocating carriage and thereby lifts the dog 46 free from engagement with the sheet material. The latch device or plunger 63 registers with one of the depressions 62 and holds the ratchet wheel and cam 55 in this position until again positively actuated. With the next forward movement of the reciprocating carriage, the carriage moves independently of the strip of material since the dog 46 remains in the lifted position during the forward movement of the carriage. Advance movement of the strip therefore does not occur with this movement of the reciprocating carriage. Upon the return movement of the reciprocating carriage the pawl 56 engages the next succeeding tooth of the ratchet wheel, moves the ratchet wheel through another 45 degrees to a position where the cam 55 disengages the dog 46 and permits the dog to return to its operative position shown in Fig. 9. In this manner the reciprocating carriage feeds the strip of material forward through the machine only upon alternate movements. A suitable handle 64 for manually rotating the cam 55 to arrest movement of the strip B is mounted on the cam shaft.

It will also be appreciated that the number of movements through which the reciprocating carriage is rendered ineffective may be controlled by changing the number of lobes of the control cam relative to the number of teeth in the ratchet wheel to thereby regulate the number of metal plates that are superposed on the plates of paper or other fibrous material in building up the assembled bodies. A particular form of cam that causes the reciprocating carriage to feed the sheet material forward for three operations and then to miss on the fourth operation, thereby providing regulated intermittent feed of the sheet material in accordance with another sequence, is also shown in Fig. 12. It will be appreciated that when the ratchet wheel is in the position shown in Fig. 12, or in any one of its succeeding three positions, the cam will remain inoperative, but upon the ratchet wheel reaching the fourth position, one lobe of the cam will be brought into engagement with the dog 46 and prevent, for that movement of the carriage, a corresponding movement of the strip material. The interposing of metal sheets on paper sheets may readily be controlled in any desired manner by changing the relative number of teeth on the ratchet wheel and cam. This is merely a matter of computation as to the relative number of metal plates that are to be superposed on a definite number of the fibrous plates, and the relation of the superposition of these plates. It will be appreciated also that this form of advancing feed may be used with other types of machines independent of the character of the sheet material that is being fed thereby.

The metal strip B is fed to various stations (not shown) where it may be notched or otherwise operated upon, as shown in said patent to William T. Hensley, No. 1,574,481, and it then passes to a position where the forward metal blank is located concentric with but above that portion of the fibrous strip that is to form with the metal blank an assembled unit C. In Fig. 4 the forward metal blank is shown sheared from the metal strip B and pressed down upon and into the surface of the paper strip to secure it to the paper strip, as described in said patent to William T. Hensley, No. 1,574,481, and also in this position the paper and metal are perforated with a center hole and suitable rivet holes through which rivets or dowels may be subsequently passed for securing the units together to form pulley assemblies. The paper portion of the unit C is not severed from the strip A, however, until it is carried forward, with the metal plate attached to it, to a position designated e and thence to a position designated f. The unit C, when advanced to the position f is concentric with and above the assembly arbor 100. For certain subsequent operations of the machine the metal blanks may or may not be added to the paper blank as heretofore explained.

The shear 101 is mounted for adjustable movement longitudinally with respect to the strip A, so that it may be adjusted to sever blanks or units of various lengths from the strip A. In this way, different widths of strips may be economically used for building up assemblies of blanks for different diameters of pulleys. The lower shear blade holder 104 is adjustably carried by the guides 102ᵃ (Fig. 6) on the forwardly extending arms 103 and the upper shear blade holder 105 is similarly adjustable along the overhanging portion 111 of the ram 11. The lower shear blade holder 104 carries guide posts 106 which are received in the socket portions 107 of the upper shear blade holder to insure rigid guided operation of the shear blades upon reciprocation of the press. The shear blades 108 and 109 are each detachably secured to the shear blade holder. Upon reciprocation of the press the portion 111 of the ram descends and the shear blade 108 passes the shear blade 109 thus cutting off a unit from the paper strip A. Further downward movement of the ram causes the unit to be pressed onto the receiving arbor mechanism about to be described.

Adjustably carried by the base of the machine is a table 112 which extends into and between the forwardly projecting arms 103 of the bolster 22. The table is secured to the machine by bolts 113 which are movable in guide slots 114 so that the table may be readily adjustable vertically by means of the hand-wheel 115 and the screw 116, the lower end of which is suitably received in a socket formed in the base portion 1ᵃ of the machine, the upper end of the screw 116 being secured to the table 112.

Adjustably carried by the table 112 is the base member 117 which forms a support for the arbor mechanism, which is caused to rotate 90 degrees on each reciprocation of the press, as hereinafter shown. The table 112 has a carriage 112ᵃ that is adjustable longitudinally with respect to the strip A in order that it may be concentrically located to receive the sheared units of the desired dimensions from the strip A. This carriage is held in adjusted position by means of bolts 112ᵇ. The base 117 has journaled therein a shaft 118 to which is secured for rotation therewith a bevel gear 119, the ends of the shaft being journaled in suitable bearings 120 carried by the member 117. Vertically journaled in the member 117 is a shaft 121 to which is keyed the bevel gear 122 which meshes with the bevel gear 119. The member 117 is outwardly flanged at its upper portion 123 to form a seat for the table 124 which is mounted for rotation with the shaft 121. In the upper portion of the table 124 suitable undercut guides 125 are formed to receive the guide flange 126 of the arbor base 127. Carried by the arbor base 127 is the arbor member 100 that has guides 129 adapted to be received in the rivet holes formed by the machine in each pulley unit C.

At the forward end of the overhanging portion 111 of the ram 11 is a pair of clamping members 130 which clamp between them an arm 131 which is slotted at 132 so that the arm 131 may be adjustably clamped between clamping members 130 and the bolt 130ᵃ. At the lower end of the arm 131 is pivoted a link 133 which is freely rotatable about the shaft 118. Keyed to the shaft 118 is a ratchet wheel 134 for rotation therewith. Carried by the link 133 is a spring pressed pawl 135 arranged to engage detents 136 in the ratchet 134 to cause step by step rotation of the ratchet wheel 134.

It will thus be seen that upon upward movement of the ram 11 the arm 131 will be moved upwardly and will cause the shaft 118 to rotate through the link 132 and the pawl and ratchet mechanism. Rotation of the shaft 118 causes rotation of the shaft 131 which in turn rotates the table 124 and the arbor base 127 to which the arbor 100 and the guides 129 are attached.

A suitable spring supported latching device 92 that is particularly shown in Fig. 3, registers with suitable depressions 93 that are formed in the coacting face of the rotating table 124 to accurately position the rotating table after each movement. In order to more positively hold the table in each advanced position, and in order that the arbor assembly tongues 129 may properly register with the apertures formed in the sheet material that is fed thereon, a spring pressed and pivotally mounted interlocking arm 138 is employed. The arm 138 is journaled in the base member 117 and is adapted to be moved in a groove 142 that is formed in the base 117 and in engagement with the notches 139 that are formed in the peripheral face of the arbor table 124. The arm 138 is moved out of the notches 139 by the downward movement of the arm 131 that also controls the rotation of the arbor as heretofore explained. After the rotating movement of the arbor begins, the arm 138 is then released by upward movement of the arm 131 and the control spring 144 causes the arm 138 to seat in the next succeeding notch 139. In this manner the table 124 is positively actuated any desired portion of a complete rotation and locked in adjusted position with each movement of the ram 11 of the press.

The removable arbor base 127 is held in its operative position by the undercut guides 125 and by the spring pressed detent 145 that seats in a suitable depression formed in the coacting face of the rotating table 126. This arrangement permits ready removal and replacement of the assembly arbor after it is properly loaded. The assembly arbor base 127 has a pair of guide fingers 129 that act in conjunction with the centering arbor 100 to position the successive sheets of material in proper registered and superposed relation on the arbor 100.

The assembly head 150, that is carried by the ram 11, has a spring pressed presser foot 151 that exerts sufficient pressure on the blanks supplied to the arbor to properly assemble them without the danger of mutilating the arbor in the event that the plates to be assembled thereon do not register with the arbor or fingers. The presser foot 151 has a hollow stem that receives the center arbor 100. The stem has a sleeve provided with a spring seating collar 153 and a helical spring 154 for holding the presser foot against the assembly blank. A transverse pin 155 that extends transversely through the upper portion of the presser foot also travels in longitudinal slots 156 that are formed in a sleeve 157 that is carried by the ram 12. The transverse pin maintains the presser head in assembled condition and in registered relation with the arbor fingers.

From the above description, the detailed operation of the individual parts of the machine will be readily understood and therefore the general operation of the machine will here be considered.

As heretofore explained, the paper strip A and the metal strip B are fed into the machine from different directions and at different elevations. The paper strip is operated upon by the machine to notch and perforate it without severing the leading blank from the strip until after the central hole overlies the receiving arbor. The metal strip B is suitably notched and after the leading metal blank arrives at the perforating station overlying the paper strip A, the leading blank is severed from the metal strip and perforated and assembled with the paper strip with which it thereafter travels, the feed control for the metal blank being so arranged that the metal blanks are deposited only on alternate paper blanks as will be understood from the preceding description. After the severed metal blank is assembled with the unsevered paper blank, the paper blank is carried forward by the movement of the strip to registering relation with the receiving arbor. It is then severed from the strip and is pressed down upon the fingers and centering pin or receiving arbor. With the return movement of the stacking head, the receiving arbor is rotated about the axis of the centering pin and locked in the rotated position by means of the latch 138. The rotation of the arbor occurs with each operation of the stacking head and this causes the grain of the successive paper blanks that are stacked on the receiving arbor to be arranged in quadrature. The advantages of so arranging the grain of the paper blanks will be obvious to those skilled in the art and the advantage of carrying the assembled paper and metal blank or the paper blank to a station directly overlying and registering with the stacking arbor before the blank is severed from the strip will also be obvious. After the arbor is loaded with a desired number of paper blanks, it is removed and replaced with an unloaded arbor.

From the above description of the machine and its operation, it will be seen that the machine embodies mechanism that feeds a strip or series of strips of material longitudinally through the machine and periodically interrupts the feed of each strip so that there is an interval of rest for each strip at certain operating stations, during which time centrally arranged perforations are formed in the arrested strip. This results in the formation of a series of centrally disposed perforations in the strip which are moved to a successive position where they overhang and register with a stacking member. A severing member that is actuated synchronously with said punching member upon each stroke thereof severs like plates from the said strip at a point equidistant from said perforations whereby the plates are accurately registered with the assembly arbor and then positively deposited thereon by operation of the stacking head. Furthermore, the feed of one of the strips is periodically arrested during one or more complete cycles of the machine in order to determine the order of superposition of the blanks from one strip relative to the blanks from the other strip. The machine also arranges the grain of the successive blanks at an angle to each other while utilizing all of the advantages of having the blanks centered over the stacking member before they are severed from the remainder of the strip.

The advantages of providing a machine operating in accordance with these principles and the method of operation employed in the stacking of the laminæ offer particular economies in the manufacture of the units and provide a materially improved resulting structure because of the particular arrangement of the grain of the individual plates as will be apparent to those skilled in the art. The flexibility of the machine in the formation of stacks of plate units from strips of material of different widths and the assembly of the metal laminæ with the fibre laminæ in any desired relation, is of particular importance in the art.

Furthermore, it is to be understood that the particular forms of apparatus shown and described, and the particular procedure set forth, are presented for purposes of explanation and illustration and that various modifications of said apparatus and procedure can be made without departing from our invention as defined in the appended claims.

What we claim is:

1. A machine for assembling blanks of grained fibrous material comprising means for moving a strip of the material in step by step relation through the machine, means for suitably perforating the material to provide a plurality of symmetrically disposed apertures therein, shearing means for severing the perforated blank of material from the strip and for depositing the same on a stacking member, a stacking member having guides adapted to enter certain of the apertures formed in said blanks, and means for rotating the stacking member a predetermined degree following each deposition of blanks thereon.

2. A machine for fabricating strip material into an assembly of blanks that comprises means for advancing the material in step by step relation through operating stations of the machine, means at the operating stations for perforating the material, shearing means for severing blanks from the material, a stacking member having a plurality of guides, means for locking the stacking member into position underlying the leading unsevered blank of material with the guides of the stacking member in registered relation with the apertures formed in said strip material, means for separating the perforated blank of material overlying the assembly member from the strip material, and means for periodically rotating said arbor a predetermined degree after the deposition thereon of a predetermined number of blanks whereby said blanks are stacked on said assembly member with the grain of certain of the blanks arranged in angular relation with respect to the grain of certain of the other blanks.

3. A machine for severing and assembling units of strip material which comprises means for feeding a strip of material through the machine in step by step movement, means for feeding a second strip of material through the machine from a different direction in step by step movement, means for arresting the movement of the second strip relative to the first strip in predetermined relation with the movement of the first strip, means for severing blanks from said strips, and means for assembling the severed blanks in stack formation.

4. A machine for severing and assembling units of strip material which comprises means for feeding a strip of material through the machine in step by step movement, means for feeding a second strip of material through the machine from a different direction in step by step movement, means for arresting the movement of the second strip relative to the first strip in predetermined relation with the movement of the first strip, means for severing blanks from said strips, means for assembling the severed blanks in stack formation, and means for changing the angularity of grain of the deposited blanks relative to the blanks being deposited in the stack.

5. In a machine of the character described, the combination of means for delivering symmetrically perforated blanks of strip material to a stacking station, a stacking member having a plurality of guides adapted to underlie the blank of material at its aforesaid stacking station, shearing means for severing the blank from the strip of material while the perforations thereof are in registered relation with receiving fingers of the stacking member, means for positively stacking the material on said assembly member, and means for successively rotating said assembly member a predetermined degree after each certain number of depositions thereon.

6. In a machine for assembling blanks, the combination of a turntable, a holder supported thereon, means for imparting a step by step turning movement to the turntable, means for feeding material, and means for cutting blanks from said material and depositing them in the holder during the intervals between successive step by step movements of the holder.

7. In a machine for assembling blanks, the combination of a turntable, a holder supported thereon, means for imparting a step by step turning movement to the turntable, means for feeding material, means for cutting blanks from said material, and means for transferring the blanks to the holder.

8. A machine for assembling blanks of grained fibrous material, comprising means for moving a strip of the material through the machine in step by step relation, a stacking member, means for cutting a blank from said strip and depositing the same in said stacking member, and means for rotating said stacking member a predetermined degree following each deposition of blanks thereon.

In testimony whereof we affix our signatures.

WILLIAM T. HENSLEY.
ROBERT H. LEWIS.